(No Model.) 2 Sheets—Sheet 1.
H. G. THOMPSON.
SULKY CORN CULTIVATOR.
No. 566,248. Patented Aug. 18, 1896.
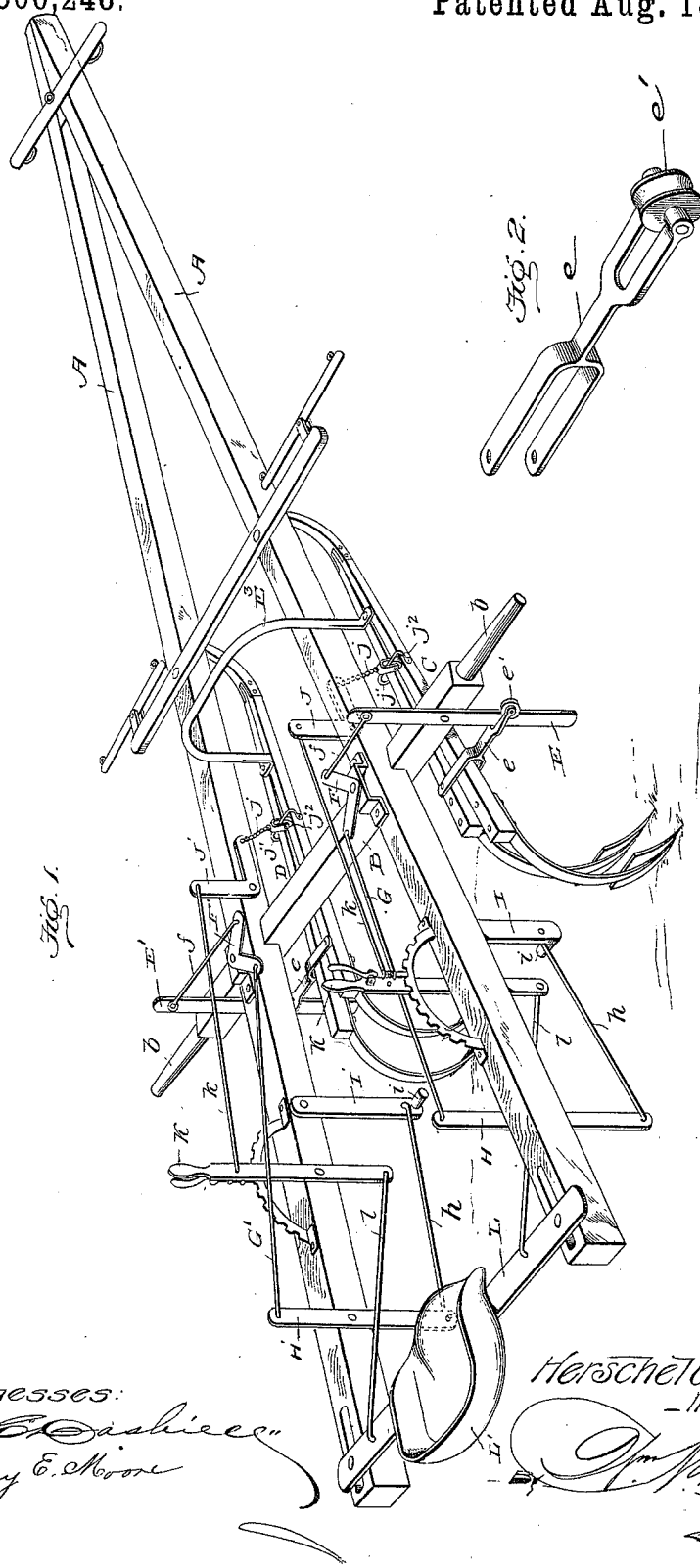
Witnesses:
Wm E Dashiell
May E. Moore
Herschel G. Thompson
—Inventor—
Wm N Moore
Atty.

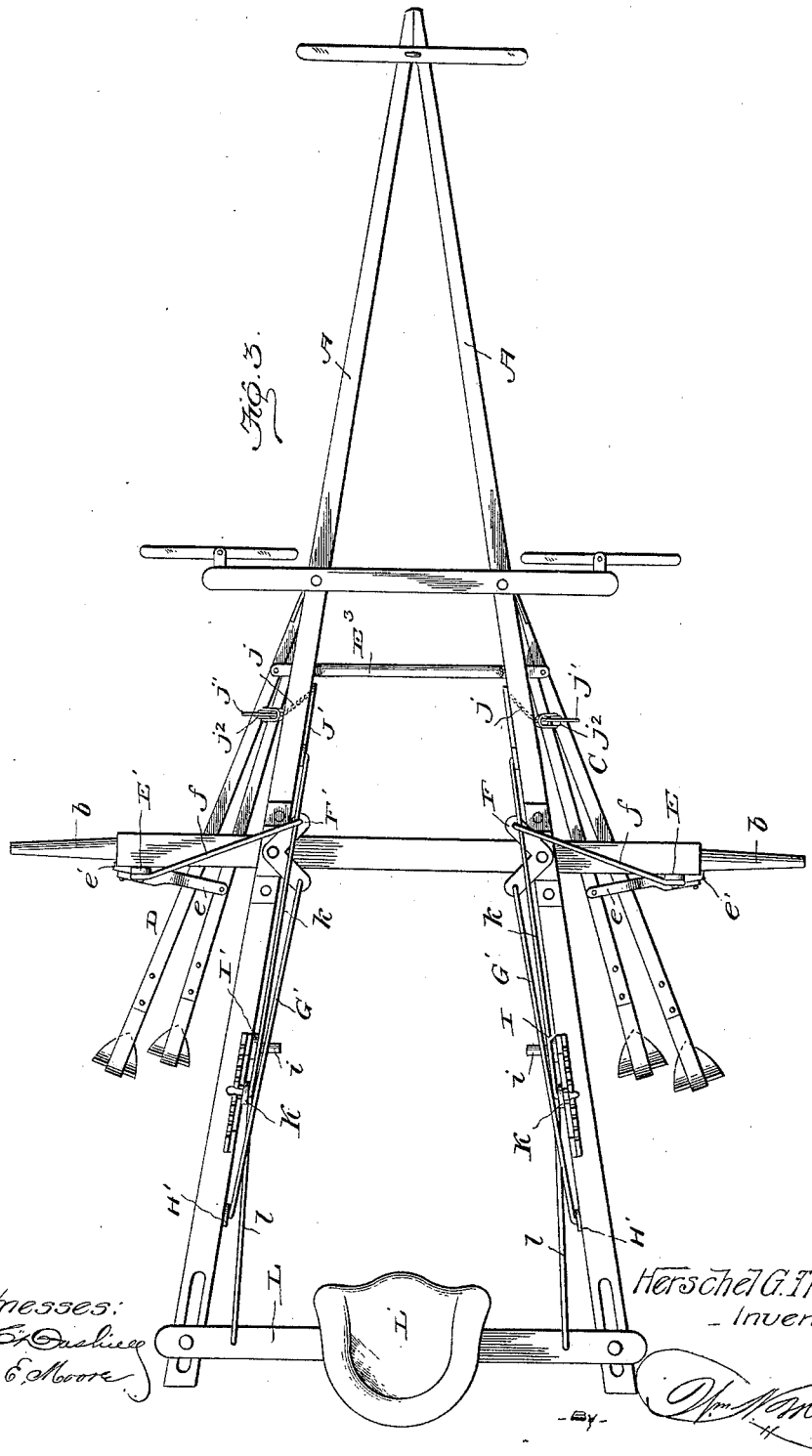

UNITED STATES PATENT OFFICE.

HERSCHEL G. THOMPSON, OF UNION CITY, OHIO, ASSIGNOR OF ONE-HALF TO CHARLES W. PIERCE AND CLARENCE S. PIERCE, OF UNION CITY, INDIANA.

SULKY CORN-CULTIVATOR.

SPECIFICATION forming part of Letters Patent No. 566,248, dated August 18, 1896.

Application filed February 24, 1896. Serial No. 580,380. (No model.)

*To all whom it may concern:*

Be it known that I, HERSCHEL G. THOMPSON, a citizen of the United States, residing at Union City, in the county of Darke and State of Ohio, have invented certain new and useful Improvements in Sulky Corn-Cultivators; and I do hereby declare the following to be a full, clear, and exact description of the invention, such as will enable others skilled in the art to which it appertains to make and use the same.

My invention relates to improvements in sulky corn-cultivators, and the objects that I have in view are, first, to provide means entirely under the control of the rider whereby the gangs of plows may be shifted laterally either to the right or left relative to the line of draft of the implement or machine, and, secondly, to the provision of means which with the raising or lowering of the gangs of plows operates to shift the seat of the driver farther toward or away from the axle of the machine to change the weight and leverage of the driver's seat according to the height of the plows.

To the accomplishments of these ends my invention consists in the novel combination of devices and in the construction and arrangement of parts which will be hereinafter more fully described, pointed out in the claims, and which are illustrated in the accompanying drawings, referring to which—

Figure 1 is a perspective view of a sulky corn-cultivator constructed in accordance with my invention. Fig. 2 is a detail view showing the coupling by which the shifting-lever is united to the gang of plows. Fig. 3 is a top plan view of the cultivator.

Referring to the drawings forming a part of this specification, and in which like letters denote like parts in all of the figures, A designates the longitudinal beams forming a part of the framework of the machine and the tongue by which the machine is drawn by horse-power across the field. To the beams is united the cross-beam B, the ends of which are provided with axle-spindles $b$, on which are fitted the carrying-wheels of the implement, which carrying-wheels are not shown in the drawings for the sake of clearly illustrating my improvements in the machine.

C D are the frames which carry the gangs of plows or cultivator-shovels, which may be of the usual or any preferred construction. These frames are pivotally connected at their forward ends to the beams of the frame A in such a manner that the frames may move laterally or sidewise as well as vertically, and to insure simultaneous adjustment of these pivoted frames they are coupled together by a yoke $E^3$, which is rigidly fastened to the frames C D in any approved manner.

I will now proceed to describe the preferred construction by which these coupled pivoted frames are shifted laterally or from side to side relative to the line of draft. To the rear side of the cross-beam B and outside of the main frame A are fulcrumed the shifting-levers E E'. Each lever is fulcrumed at an intermediate point of its length to this cross-beam, and the lower end of each lever is connected to a strap $e$, which is in the form of a double yoke, one end of the strap being rigidly fastened to one of the frames that carry the gang of plows or cultivator-shovels while in the other yoke-formed end of the strap is mounted an antifriction-roller $e'$.

The lower end of the shifting-lever is loosely fitted in this yoke-formed end of the strap $e$ in a manner to cause the gang-frame to move laterally with the lever E or E', and yet allow the gang-frame to be moved vertically with respect to the lever and without affecting the lever or the connection between the shifting-lever and the frame to which it is connected. The upper ends of these shifting-levers are pivoted to pitmen $f$, which extend inwardly and are pivoted to bell-crank levers F F', which are fulcrumed to suitable supports fastened to the top of the beams which form the main frame A of the machine. To the other ends of these bell-crank or segment-shaped levers F F' are pivoted the rods G G', which extend rearward and are pivoted to the upper ends of the levers H H', the latter being fulcrumed at intermediate points of their length to the beams of the frame A. These last-mentioned levers H H' have their lower ends connected by the rods $h\ h$ to the foot-levers I I', which are also fulcrumed on the beams of frame A and which are provided with the angular foot-rests $i$, against which the operator may press with his feet.

It will readily be seen that the operator may press with his feet against one of the levers I or I' to move the proper shifting-lever E or E' through the described connections, so as to shift the gangs of plows in one direction, while by pressing against the other foot-lever the gangs of plows may be readily moved in the opposite direction to the line of draft, thus placing the gangs of plows under the control of the operator occupying the driver's seat on the machine.

I will now describe the mechanism by which the position of the driver's seat is changed on the frame A, according as the gangs of plows are raised or lowered.

To the beams of frame A, forward of the axle, are fulcrumed the grooved segment-shaped or bell-crank levers J J', one arm of which levers is connected by the chains $j\ j$ with the clips $j'\ j'$, attached to the frames of the gangs of plows. The other arms of these segment-shaped or bell-crank levers are connected by the links $k\ k$ with the hand-levers K K, each fulcrumed at an intermediate point of its length on the frame A, the rods $k$ being pivoted to the hand-levers K K above the fulcrums thereof. The lower ends of these hand-levers have the links $l\ l$ pivoted thereto, and these links extend rearwardly and are attached to the slidable bar L, which carries the driver's seat L', said bar L being held on the frame-beams A by means of bolts which pass through slots produced in the beams of frame A, as clearly shown in the drawings.

When the hand-levers K K are operated to raise the gangs of plows, the links $l\ l$ pull on the bar L to move the latter and the seat forward on the main frame A of the machine, but when the plows are lowered by shifting the hand-levers in the opposite direction the seat-carrying bar is moved toward the rear of the main frame A. These hand-levers are provided with hand-controlled holding-pawls which engage with toothed sectors fastened to the main frame, as shown.

It is thought that the operation and advantages of my invention will be readily understood and appreciated from the foregoing description taken in connection with the drawings.

The clips $j'$, attached to the frames of the gang of plows, afford tracks or guides for the rollers or pulleys $j^2$, which are loosely attached to the segment-shaped levers $j'$ by the intermediate chains. By providing this slidable connection between the gang of plows and the means for adjusting them vertically and for sustaining them in the desired positions to regulate the depth of plowing the lateral shifting of the gang of plows either to the right or left by operating the foot-levers can be effected without in any wise disturbing the depth to which the plows penetrate the ground or without disturbing the said means for adjusting the plow-gangs vertically.

What I claim as new is—

1. The combination with the frame, the axle carried by the frame, the two gangs of plows suspended from the frame, the levers fulcrumed to the axle and having their lower ends connected with the gangs of plows, the bell-crank levers connected to the upper end of said levers and foot-operating levers connected to the bell-crank levers; whereby the gangs may be shifted laterally through the foot-levers.

2. The combination of the frame, the gangs of plows suspended from said frame, the bell-crank levers having their lower ends connected to said gangs of plows, the hand-levers connected to the upper ends of said bell-crank levers, and a sliding seat connected to the lower end of the hand-levers.

3. The combination of the frame, the two gangs of plows suspended from said frame, the bell-crank levers having their lower ends connected to said gangs, the hand-levers connected to the upper end of the bell-crank levers for raising and lowering the gangs, the levers having their lower ends connected with the gangs, the bell-crank levers fulcrumed to the frame and connected with the last-named levers, and the foot-levers connected with the last-named bell-crank levers for shifting the gangs laterally.

4. The combination with gangs of plows, of a slidable seat-carrying bar, hand-levers linked to said slidable bar, and connections between the hand-levers and the gangs of plows for giving vertical movement to said gangs of plows, and foot-levers connected with the gangs of plows for shifting them laterally, substantially as and for the purposes described.

5. The combination of the frame, two gangs of plows suspended or supported from said frame, hand-operating mechanism for elevating and lowering the gangs of plows, foot-operating mechanism for moving the gangs laterally, and a sliding seat connected with the hand mechanism.

In testimony whereof I affix my signature in presence of two witnesses.

HERSCHEL G. THOMPSON.

Witnesses:
GEO. WELLS SMITH,
P. A. TAYLOR.